US010663232B2

(12) United States Patent
Rao et al.

(10) Patent No.: US 10,663,232 B2
(45) Date of Patent: May 26, 2020

(54) ENERGY STORAGE SYSTEM COUPLING PHASE CHANGE MATERIAL AND DISSIPATION HEAT PIPE

(71) Applicant: China University of Mining and Technology, Jiangsu (CN)

(72) Inventors: Zhonghao Rao, Jiangsu (CN); Jiateng Zhao, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 16/303,144

(22) PCT Filed: Dec. 1, 2017

(86) PCT No.: PCT/CN2017/114241
§ 371 (c)(1),
(2) Date: Nov. 20, 2018

(87) PCT Pub. No.: WO2018/192230
PCT Pub. Date: Oct. 25, 2018

(65) Prior Publication Data
US 2019/0293359 A1    Sep. 26, 2019

(30) Foreign Application Priority Data

Apr. 18, 2017    (CN) .......................... 2017 1 0253242

(51) Int. Cl.
*F28D 15/02* (2006.01)
*F28D 20/02* (2006.01)

(52) U.S. Cl.
CPC ......... *F28D 15/0275* (2013.01); *F28D 15/02* (2013.01); *F28D 20/021* (2013.01); *F28D 2015/0216* (2013.01); *Y02E 60/145* (2013.01)

(58) Field of Classification Search
CPC .. F28D 15/02; F28D 15/0275; F28D 15/0266; F28D 20/02; F28D 20/021; Y02E 60/145
See application file for complete search history.

(56) References Cited

U.S. PATENT DOCUMENTS

| | | | | |
|---|---|---|---|---|
| 4,131,158 | A | * | 12/1978 | Abhat .................... C09K 5/063 126/400 |
| 4,976,308 | A | * | 12/1990 | Faghri .................... F28D 15/02 165/10 |

(Continued)

FOREIGN PATENT DOCUMENTS

| | | |
|---|---|---|
| CN | 102034773 | 4/2011 |
| CN | 103528035 | 1/2014 |

(Continued)

OTHER PUBLICATIONS

"International Search Report (Form PCT/ISA/210)", dated Mar. 6, 2018, with English translation thereof, pp. 1-4.

*Primary Examiner* — Eric S Ruppert
(74) *Attorney, Agent, or Firm* — JCIPRNET (57) ABSTRACT

Provided is an energy storage system coupling phase change material(s) and dissipation heat pipe(s). The energy storage system includes several energy storage units serially connected along a same central axis. Each of the energy storage units includes a heat charge flow channel, an annular heat release passage, and an annular energy storage passage disposed concentrically from inside to outside. A dissipation pulsating heat pipe is disposed in the energy storage unit, and the dissipation pulsating heat pipe includes several pulsating-heat-pipe branches uniformly arranged in a circumferential direction. Each of the pulsating-heat-pipe branches includes an evaporation section located in the heat charge flow channel, a transfer section located in the annular heat release passage, and a condensation section located in the annular energy storage passage, and adjacent pulsating- (Continued)

heat-pipe branches are sequentially in communication through a root port of the evaporation section to enable the entire dissipation pulsating heat pipe to form a closed loop. A phase change material in tight contact with the condensation section is filled in the annular energy storage passage.

8 Claims, 5 Drawing Sheets

(56) References Cited

U.S. PATENT DOCUMENTS

2008/0029506 A1 2/2008 Neal
2018/0224215 A1* 8/2018 Thiers .................... F24T 10/13

FOREIGN PATENT DOCUMENTS

| CN | 106532994 | 3/2017 | |
|----|-----------|--------|---|
| CN | 107014235 | 8/2017 | |
| DE | 2837091 A1 * | 3/1980 | ......... F28D 20/0034 |

* cited by examiner

ENERGY STORAGE SYSTEM COUPLING PHASE CHANGE MATERIAL AND DISSIPATION HEAT PIPE

CROSS-REFERENCE TO RELATED APPLICATION

This application is a 371 of international application of PCT application serial no. PCT/CN2017/114241, filed on Dec. 1, 2017, which claims the priority benefit of China application no. 201710253242.5, filed on Apr. 18, 2017. The entirety of each of the abovementioned patent applications is hereby incorporated by reference herein and made a part of this specification.

BACKGROUND OF THE INVENTION

Field of the Invention

The present invention relates to storage and utilization of industrial waste heat, and in particular, to an energy storage system coupling phase change material(s) and dissipation heat pipe(s).

Description of Related Art

With the development of economy and society, high energy consumption and severe environmental pollution become two major problems, and requirements of energy conservation and emission reduction become increasingly urgent. In China, the industrially consumed energy accounts for about 70% of the total consumed energy and the energy consumption is relatively high. Major causes are low utilization of industrial waste heat and inadequate energy utilization. The energy utilization in China is only about 33%. At least about 50% of consumed energy is discharged in various forms of waste heat. Therefore, waste heat resources are very abundant in China. Waste heat recycling can further improve energy utilization efficiency, thereby reducing fossil fuel usage and reducing pollutant discharge.

Currently, the problem of recycling industrial waste heat has attracted the attention of governments, institutes, and enterprises. In existing types of technologies, industrial waste heat utilization technologies mainly include a heat-to-work conversion technology, a heat exchange technology, and a cooling and heating technology. A regenerative heat exchanger belongs to the heat exchange technology. A main principle of the regenerative heat exchanger is that cold and hot fluids alternately flow through a regenerative element to perform heat exchange. Phase change materials have vast potential in thermal energy storage and utilization. A pulsating heat pipe has relatively strong heat transfer performance and can be used as a desirable heat transfer medium for connecting a heat source, a heat storage system, and a user.

SUMMARY OF THE INVENTION

Inventive objective: To overcome the deficiencies that exist in the prior art, the present invention provides an energy storage system coupling phase change material(s) and dissipation heat pipe(s), which has characteristics such as simple structure, convenient assembly, and relatively low costs, and can utilize high latent heat of phase change materials and high thermal conductivity of pulsating heat pipes so as to effectively improve the recycling rate of industrial waste heat, and is flexible in use.

Technical solution: To achieve the foregoing objective, the technical solution used in the present invention is as follows:

An energy storage system coupling phase change material(s) and dissipation heat pipe(s) includes several energy storage units serially connected along a same central axis. Each energy storage unit includes a heat charge flow channel, an annular heat release passage, and an annular energy storage passage disposed concentrically from inside to outside. The heat charge flow channels, the annular heat release passages, and the annular energy storage passages of adjacent energy storage units are all fitted and connected through engaging grooves and are in communication with each other.

Wherein, a dissipation pulsating heat pipe is disposed in the energy storage unit, and the dissipation pulsating heat pipe includes several pulsating-heat-pipe branches uniformly arranged in a circumferential direction of the energy storage unit. Each of pulsating-heat-pipe branches includes an evaporation section located in the heat charge flow channel, a transfer section located in the annular heat release passage, and a condensation section located in the annular energy storage passage, and adjacent pulsating-heat-pipe branches are sequentially in communication through a root port of the evaporation section to enable the entire dissipation pulsating heat pipe to form a closed loop. A phase change material in tight contact with the condensation section is filled in the annular energy storage passage, and an annular-heat-release-passage end cover and an annular-energy-storage-passage end cover are disposed on each of the energy storage units at a head end and a tail end.

Therefore, a central flow channel may be directly connected to the heat source, and the annular heat release passage may be directly connected to a cold source. The pulsating heat pipe is used as a bridge for connecting a waste heat source, a heat storage medium, and a user to produce an effect of efficient heat transfer. Energy storage units have a compact and simple structure, and single energy storage unit facilitates repair and replacement. The energy storage unit comprises both a heat charge flow channel and an annular heat release passage and can complete an energy storage process and an energy release process at the same time or can separately complete an energy storage process and an energy release process. The shape of the system can vary flexibly according to actual structures. A plurality of energy storage units can be connected to form a large energy storage and release system.

Preferably, a high-temperature-resistant and corrosion-resistant sealing washer is disposed in each of the engaging grooves to effectively prevent leakage of the fluid or the phase change material at a connection, thereby ensuring the sealing performance between the heat charge flow channels, the annular heat release passages, and the annular energy storage passages.

Preferably, the evaporation section, the transfer section, and the condensation section of the pulsating-heat-pipe branch may use a linear structure, an arc-shaped structure or a spiral structure, so that three parts on a dissipation branch have varied geometrical shapes and structures, the shape and structure of a pulsating heat pipe may be designed according to actual heat transfer requirements to ensure heat exchange efficiency.

Preferably, a fin is disposed on the branch. It is determined, according to an actual case, whether to dispose fins in different positions on a pulsating heat pipe to improve heat exchange efficiency.

Preferably, a working medium in the dissipation pulsating heat pipe may use a self-rewetting fluid, a micro/nano encapsulated phase change material emulsion or a nanofluid, for example, a water/heptanol solution and an aqueous solution of nano metal.

Preferably, the phase change material is a medium-high temperature phase change material or a medium-low temperature phase change material, and may be specifically a composite phase change material, an encapsulated phase change material, a metal-based phase change material or the like, for example, a molten salt phase change material, a hydrated salt phase change material, a Zn—Mg alloy phase change material or the like.

Preferably, a starting temperature of the dissipation pulsating heat pipe is lower than a phase change temperature of the phase change material. The phase change temperature of the phase change material means a temperature when a phase change process occurs, including a latent heat absorption process and a latent heat release process. The starting temperature of the pulsating heat pipe means a lowest temperature that needs to be maintained for continuous oscillation of a vapor plug and a liquid slug inside the pulsating heat pipe. At this time, the pulsating heat pipe has extremely high heat transfer capability. The working medium inside the pulsating heat pipe can maintain an oscillating state in the heat release process of the phase change material only when the starting temperature of the pulsating heat pipe is lower than the phase change temperature of the phase change material.

Preferably, an outer wall of the annular energy storage passage has a sandwich structure, which can be vacuumed, or filled with thermal insulation material or the phase change material, in an interlayer. A thermal loss of the annular energy storage passage is greatly reduced by using a special thermal insulation design.

Preferably, the energy storage units may be rotatably adjusted according to an actual condition to adjust relative positions of the dissipation pulsating heat pipes of different energy storage units, so as to adjust flowing resistance in the flow channel to regulate the heat exchange efficiency between the fluid and the pulsating heat pipe, thereby improving heat storage and release efficiency of the system.

Beneficial effect: The energy storage system coupling phase change material(s) and dissipation heat pipe(s) provided in the present invention has the following advantages compared with the prior art: 1. The structure is simple and compact, the assembly is convenient, the costs are relatively low, repair and replacement are facilitated, and high latent heat of phase change materials and high thermal conductivity of pulsating heat pipes are utilized to greatly improve the recycling rate of industrial waste heat. 2. The energy storage system can be stationary or movable, and the energy storage process and the energy release process may take place at the same time or separately, thereby resolving the problem that the energy storage process and the energy release process do not match each other in time and space.

In the drawings: 1, energy storage unit; 2, heat charge flow channel; 3, annular heat release passage; 4, annular energy storage passage; 5, engaging groove; 6, pulsating-heat-pipe branch; 7, evaporation section; 8, transfer section; 9, condensation section; 10, phase change material; 11, annular-heat-release-passage end cover; 12, annular-energy-storage-passage end cover; 13, fin; 14, root port; and 15, outer wall.

DETAILED DESCRIPTION OF THE INVENTION

The present invention is further described below with reference to the accompanying drawings.

Embodiment 1

Figure 1:
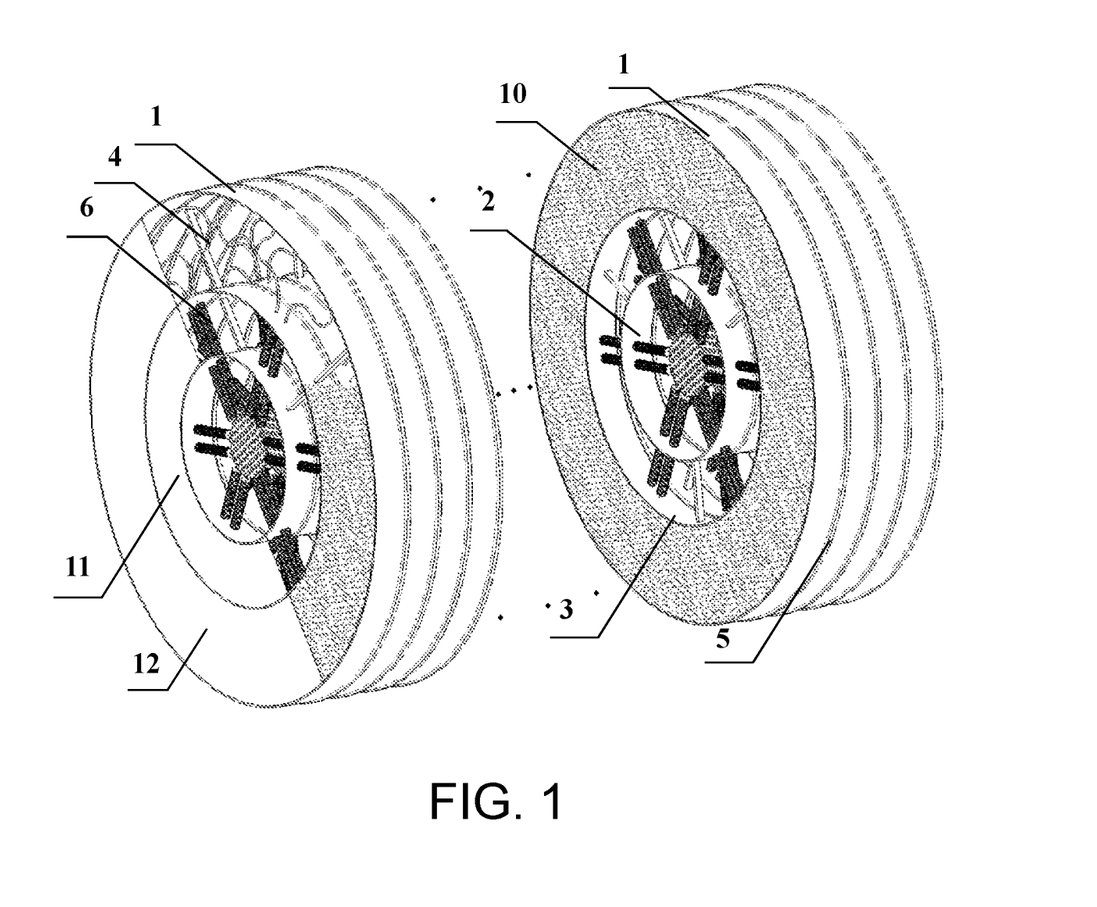
FIG. 1 is a schematic structural diagram of an energy storage system coupling phase change material(s) and dissipation heat pipe(s) according to the present invention.

FIG. 1 shows an energy storage system coupling phase change material(s) and dissipation heat pipe(s). The energy storage system includes several energy storage units 1 serially connected along a same central axis. Each of the energy storage units 1 includes a heat charge flow channel 2, an annular heat release passage 3, and an annular energy storage passage 4 disposed concentrically from inside to outside. The heat charge flow channels 2, the annular heat release passages 3, and the annular energy storage passages 4 of adjacent energy storage units 1 are all fitted and connected through engaging grooves 5 and are in communication with each other.

Wherein, a dissipation pulsating heat pipe is disposed in the energy storage unit 1, and the dissipation pulsating heat pipe includes several pulsating-heat-pipe branches 6 uniformly arranged in a circumferential direction of the energy storage unit 1. Each of the pulsating-heat-pipe branches 6 includes an evaporation section 7 located in the heat charge flow channel 2, a transfer section 8 located in the annular heat release passage 3, and a condensation section 9 located in the annular energy storage passage 4, and adjacent pulsating-heat-pipe branches 6 are sequentially in communication through a root port 14 of the evaporation section 7 to enable the entire dissipation pulsating heat pipe to form a closed loop. A phase change material 10 in tight contact with the condensation section 9 is filled in the annular energy storage passage 4, and an annular-heat-release-passage end cover 11 and an annular-energy-storage-passage end cover 12 are disposed on each of the energy storage units 1 at a head end and a tail end 1.

Figure 3:
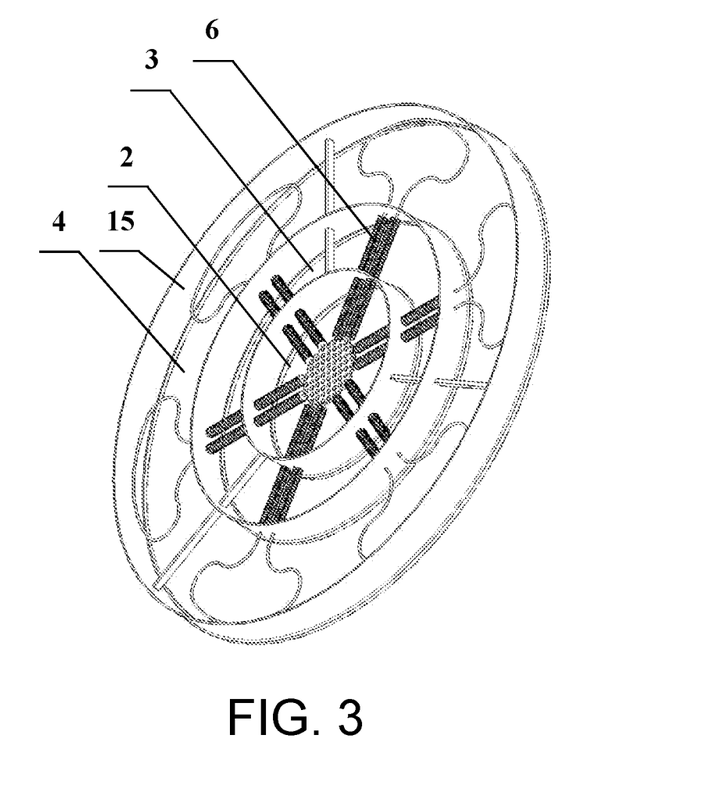
FIG. 3 is an isometric view of a single energy storage unit in the present invention.

A high-temperature-resistant and corrosion-resistant sealing washer is disposed in each of the engaging grooves 5 to effectively prevent leakage of a fluid or the phase change material 10 at a connection. As shown in FIG. 3, an outer wall 15 of the annular energy storage passage 4 has a sandwich structure, and a vacuum may be created, a thermal insulation material may be filled or the phase change material 10 may be filled, in an interlayer, so as to reduce thermal loss.

Figure 2:
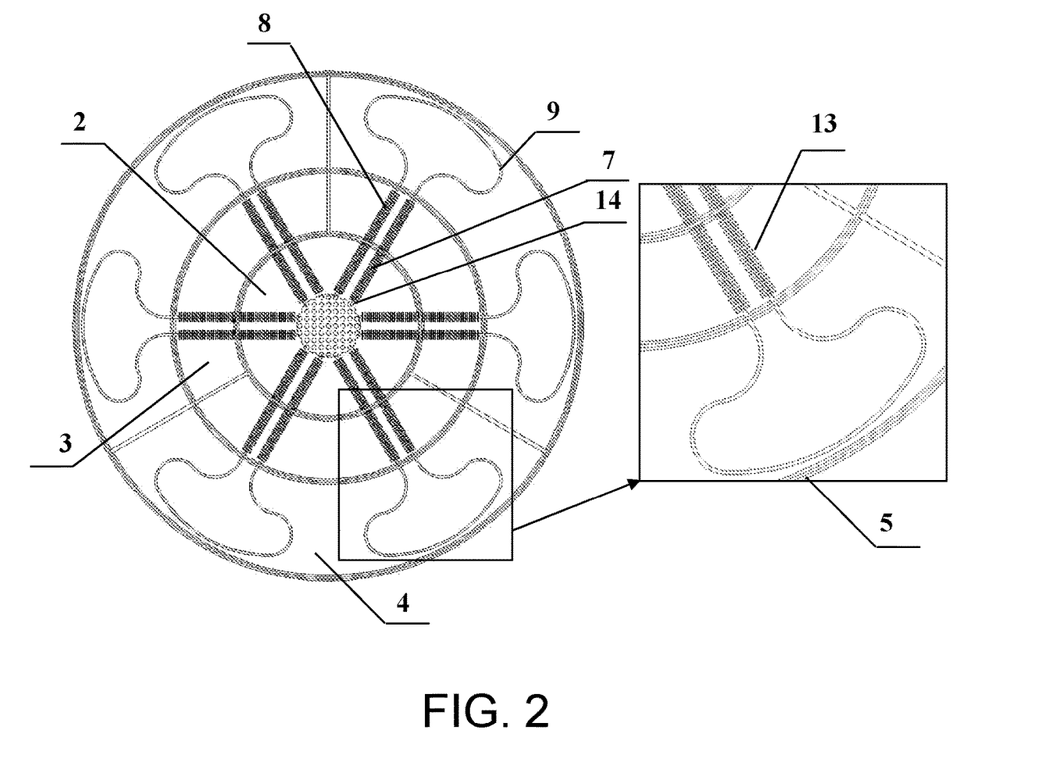
FIG. 2 is a schematic structural diagram of a single energy storage unit in the present invention.
Figure 4:
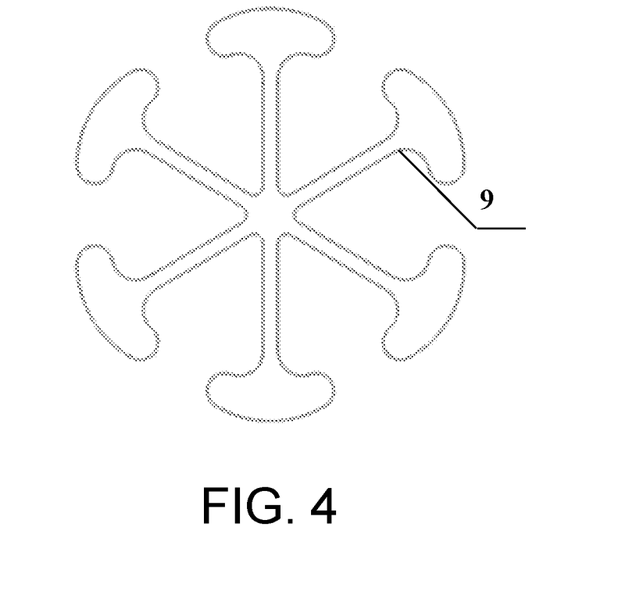
FIG. 4 is a schematic diagram of a dissipation pulsating heat pipe in Embodiment 1.

Three parts on the dissipation pulsating-heat-pipe branch 6 have varied geometrical shapes and structures. As shown in FIG. 2 and FIG. 4, in this embodiment, the evaporation section 7 and the transfer section 8 of the pulsating-heat-pipe branch 6 are linear, a fin 13 is disposed on the pulsating-heat-pipe branch 6, and the condensation section 9 has an ear shape.

The material of the dissipation pulsating heat pipe is a temperature-resistant, pressure-resistant, corrosion-resistant, and high-thermal-conductivity material and may be copper, stainless steel and another metal or alloy. A working medium in the dissipation pulsating heat pipe may use a self-rewetting fluid, a micro/nano encapsulated phase change material emulsion or a nano-fluid, for example, a water/heptanol solution and an aqueous solution of nano metal.

The phase change material 10 is a middle and high temperature phase change material or a middle and low temperature phase change material, and may be specifically a composite phase change material, an encapsulated phase change material, a metal-based phase change material or the like, for example, a molten salt phase change material, a hydrated salt phase change material or a Zn—Mg alloy phase change material.

A starting temperature of the dissipation pulsating heat pipe is lower than a phase change temperature of the phase change material 10.

The energy storage units 1 may be rotatably adjusted according to an actual condition to adjust relative positions of the dissipation pulsating heat pipes of different energy storage units 1, so as to adjust flowing resistance in a flow channel, thereby improving a heat exchange capability between a fluid and a pulsating heat pipe in the flow channel.

The energy storage system uses a dissipation pulsating heat pipe as a heat transfer medium and does not require another heat transfer medium that is forced to flow, so that energy consumption is reduced. An energy storage and release apparatus can be stationary or movable. The "movable" here means that a designed energy storage system does not need to be fixed together with a heat source, and a heat storage process and a heat release process of the energy storage and release apparatus may be performed at different places. For example, heat is stored at a factory. Because a heat storage system has a relatively flexible structure, trucks may be used for transportation to a required place to release heat.

In the present invention, the advantage of high latent heat of phase change materials and the advantages such as high thermal conductivity, flexible structures, and low costs of pulsating heat pipes are appropriately combined. A waste heat fluid flows through a central heat charge flow channel and exchanges heat with an evaporation section at a root portion of a dissipation pulsating heat pipe. Heat is transferred to an annular-energy-storage-passage area at an end portion via a pulsating heat pipe. A fin on the pulsating heat pipe can improve heat exchange efficiency. The phase change materials store heat in a sensible heat form or a latent heat form. The stored heat is transferred to a middle portion via the pulsating heat pipe to rapidly release heat to a heat exchange medium. Therefore, the heat storage process and the heat release process of the energy storage system may take place at the same time or separately, thereby resolving the problem that heat storage and heat release do not match each other in time and space.

In the present invention, the structures of the energy storage units are simple and compact. The shape of the system can vary flexibly according to actual structures. A plurality of units may be connected to form a large energy storage system. Several energy storage units of the present invention are appropriately combined and designed to adapt to recycling of various types of industrial waste heat. Potential economic value and environmentally-friendly value are provided.

The energy storage units have excellent heat storage and heat release capabilities. Based on different heat storage temperature ranges, the types of phase change materials, the types of working media in pulsating heat pipes, and the material types of the pipe walls of pulsating heat pipes may be changed to satisfy requirements.

Embodiment 2

Figure 5:
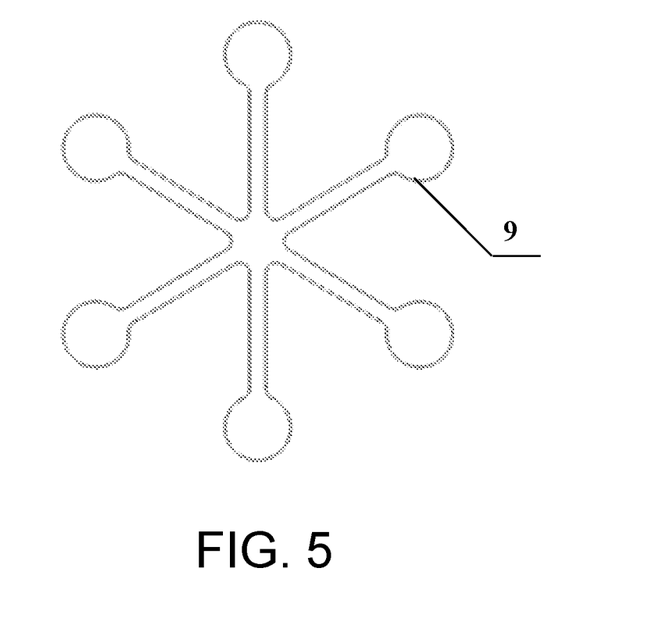
FIG. 5 is a schematic diagram of a dissipation pulsating heat pipe in Embodiment 2.

As shown in FIG. 5, in this embodiment, the condensation section 9 of the pulsating-heat-pipe branch 6 has a circular structure, and other implementation manners are the same as those in Embodiment 1.

Embodiment 3

Figure 6:
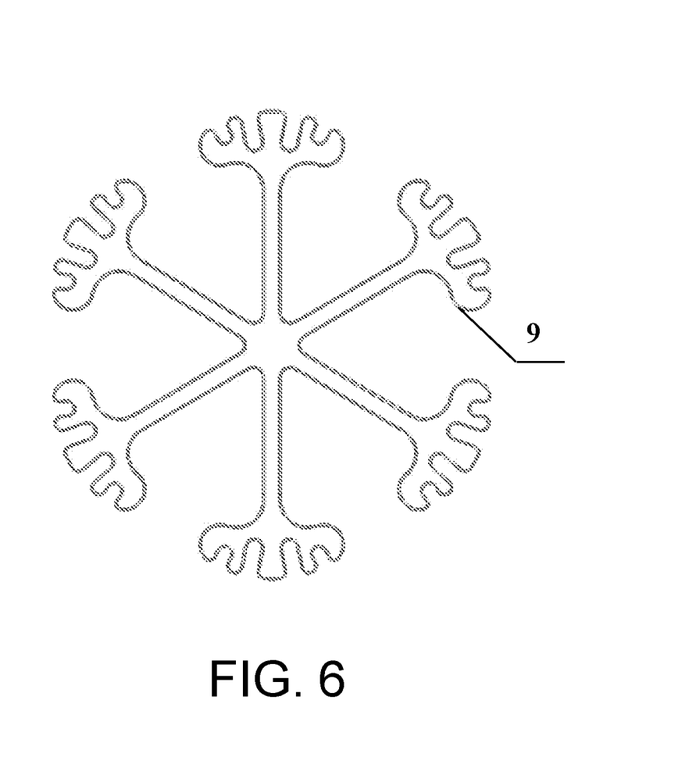
FIG. 6 is a schematic diagram of a dissipation pulsating heat pipe in Embodiment 3.

As shown in FIG. 6, in this embodiment, the condensation section 9 of the pulsating-heat-pipe branch 6 has a wavy structure, and other implementation manners are the same as those in Embodiment 1.

Embodiment 4

Figure 7:
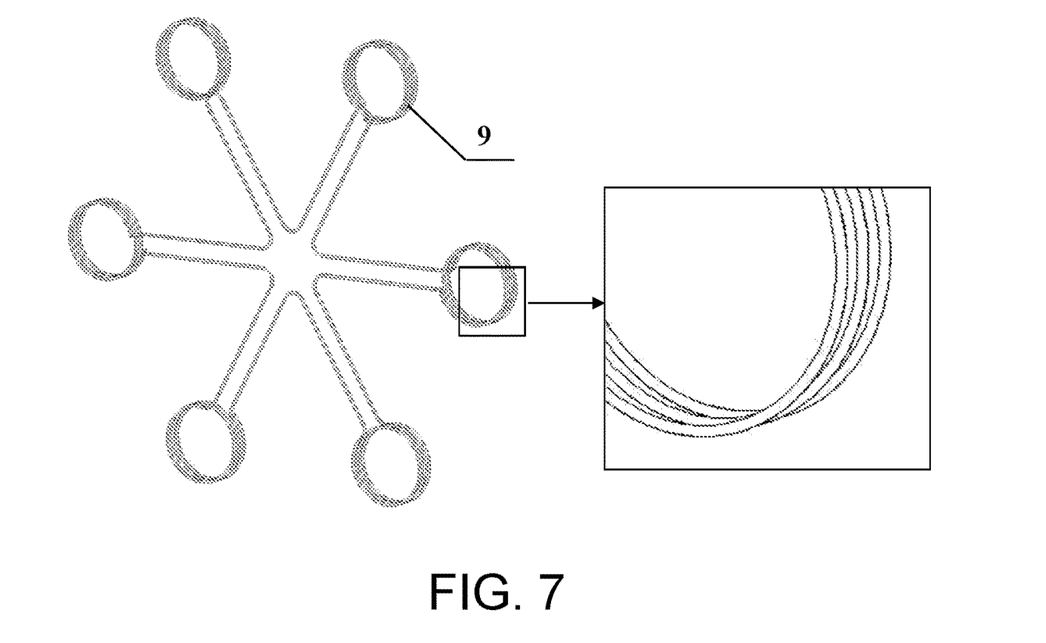
FIG. 7 is a schematic diagram of a dissipation pulsating heat pipe in Embodiment 4.

As shown in FIG. 7, in this embodiment, the condensation section 9 of the pulsating-heat-pipe branch 6 has a three-dimensional spiral structure, and other implementation manners are the same as those in Embodiment 1.

Embodiment 5

Figure 8:
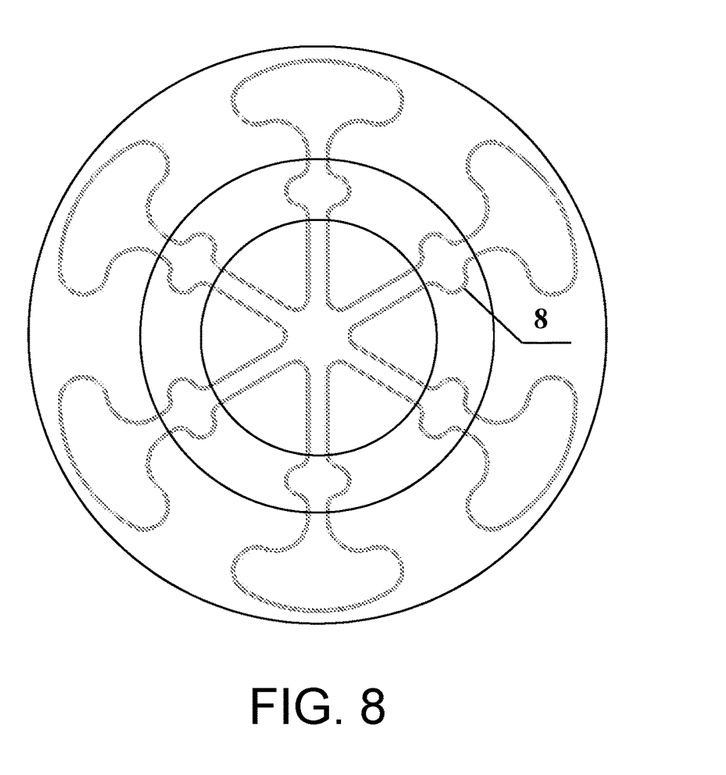
FIG. 8 is a schematic diagram of a dissipation pulsating heat pipe in Embodiment 5.

As shown in FIG. 8, in this embodiment, the transfer section 8 of the pulsating-heat-pipe branch 6 has a semicircular structure, and other implementation manners are the same as those in Embodiment 1.

The foregoing descriptions are only preferred implementation manners of the present invention. It should be noted that for a person of ordinary skill in the art, several improvements and modifications may further be made without departing from the principle of the present invention. These improvements and modifications should also be deemed as falling within the protection scope of the present invention.

What is claimed is:

1. An energy storage system coupling phase change material and dissipation heat pipe, comprising a plurality of energy storage units serially connected along a same central axis, each of the energy storage units comprising a heat charge flow channel, an annular heat release passage, and an annular energy storage passage disposed concentrically from inside to outside; and the heat charge flow channels, the annular heat release passages, and the annular energy storage passages of adjacent energy storage units being all fitted and connected through engaging grooves and being in communication with each other, wherein the dissipation heat pipe is disposed in each of the energy storage units, and the dissipation heat pipe comprises a plurality of pulsating-heat-pipe branches uniformly arranged in a circumferential direction of each of the energy storage units; each of the pulsating-heat-pipe branches comprises an evaporation section located in each of the heat charge flow channels, a transfer section located in each of the annular heat release passages, and a condensation section located in each of the annular energy storage passages, and adjacent pulsating-heat-pipe branches are sequentially in communication through a root port of the evaporation section; and the phase change material is filled in each of the annular energy storage passages, and an annular-heat-release-passage end cover and an annular-energy-storage-passage end cover are disposed on both ends of each of the energy storage units.

2. The energy storage system coupling phase change material and dissipation heat pipe according to claim 1, wherein a high-temperature-resistant and corrosion-resistant sealing washer is disposed in each of the engaging grooves.

3. The energy storage system coupling phase change material and dissipation heat pipe according to claim 1, wherein the evaporation section, the transfer section, and the condensation section of each of the pulsating-heat-pipe branches are a linear structure, an arc-shaped structure or a spiral structure.

4. The energy storage system coupling phase change material and dissipation heat pipe according to claim 1, wherein a fin is disposed on each of the pulsating-heat-pipe branches.

5. The energy storage system coupling phase change material and dissipation heat pipe according to claim 1, wherein a working medium in the dissipation heat pipe is a self-rewetting fluid, a micro/nano encapsulated phase change material emulsion or a nano-fluid.

6. The energy storage system coupling phase change material and dissipation heat pipe according to claim 1, wherein a starting temperature of the dissipation heat pipe is lower than a phase change temperature of the phase change material.

7. The energy storage system coupling phase change material and dissipation heat pipe according to claim 1, wherein an outer wall of each of the annular energy storage passages has a sandwich structure, which is capable of being vacuumed, or filled with thermal insulation material or the phase change material, in an interlayer.

8. The energy storage system coupling phase change material and dissipation heat pipe according to claim 1, wherein the energy storage units are capable of being rotatably adjusted.

* * * * *